Nov. 13, 1962 L. BELOVE 3,064,065
FUSION-SEALED METAL-ENCASED RECHARGEABLE ALKALINE BATTERY CELL
Filed May 10, 1961 2 Sheets-Sheet 1
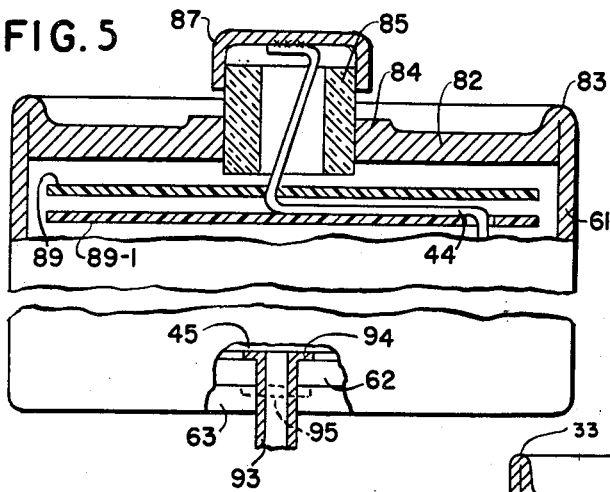
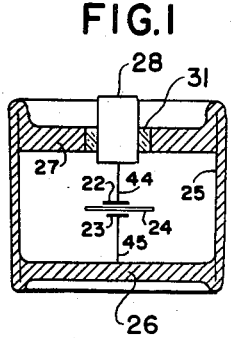
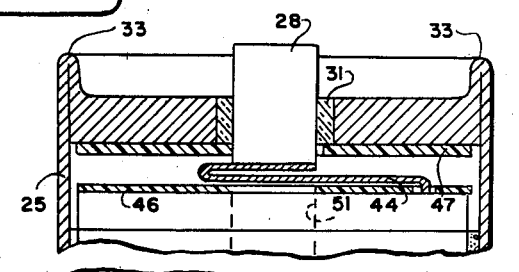
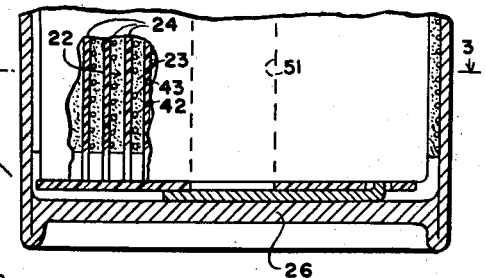
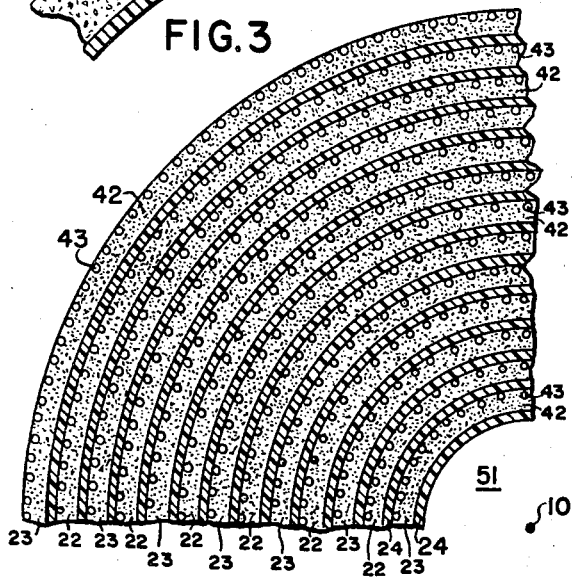
INVENTOR.
L. BELOVE
BY
OSTROLENK, FABER, GERB & SOFFEN
ATTORNEYS

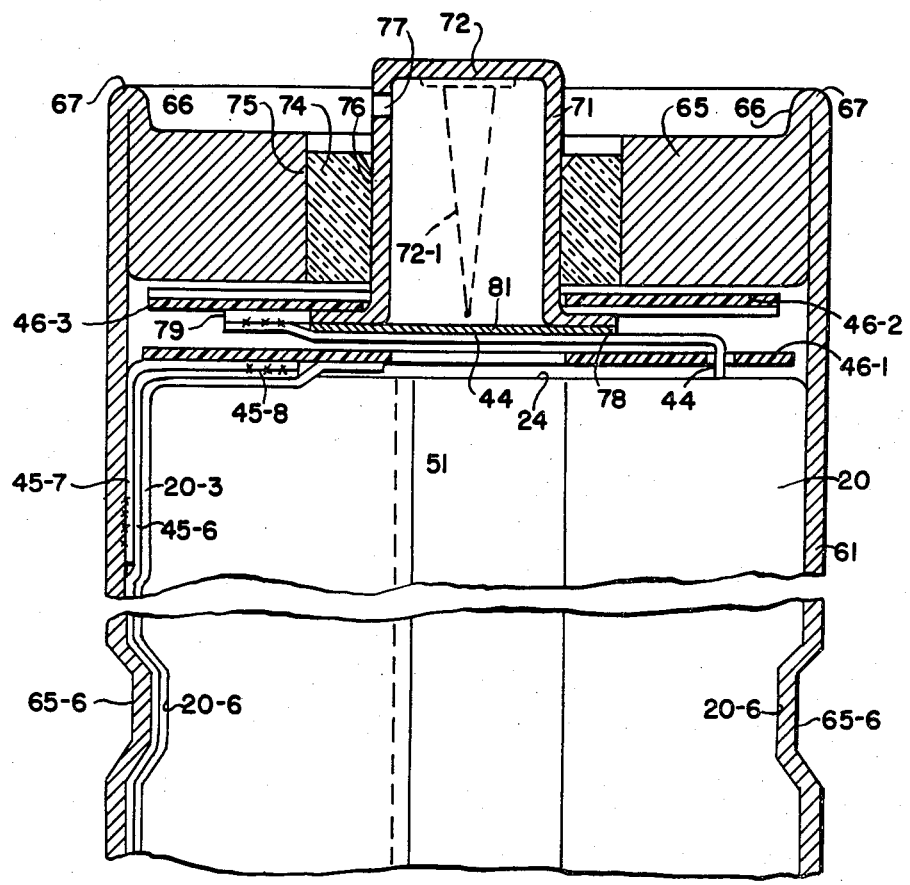
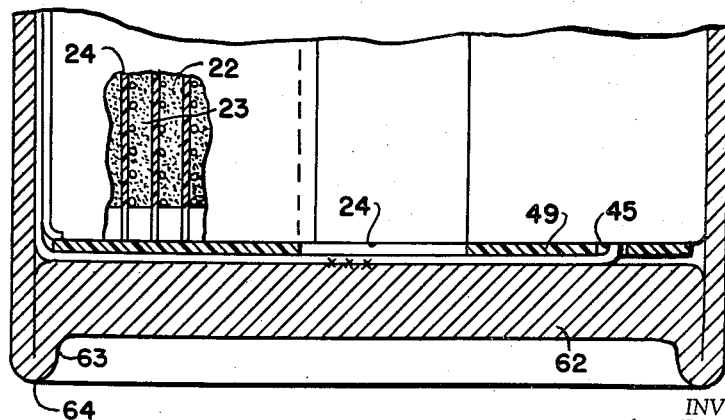
FIG. 4

United States Patent Office 3,064,065
Patented Nov. 13, 1962

3,064,065
FUSION-SEALED METAL-ENCASED RECHARGE-
ABLE ALKALINE BATTERY CELL
Louis Belove, Ardsley, N.Y., assignor to Sonotone Corporation, Elmsford, N.Y., a corporation of New York
Filed May 10, 1961, Ser. No. 119,762
18 Claims. (Cl. 136—6)

This invention relates to rechargeable electric battery cells, and particularly to hermetically sealed battery cells operating with an alkaline electrolyte, although some aspects of the invention are of broader scope. This application is a continuation in part of my application Serial No. 843,402 filed September 30, 1959 and now abandoned.

The electrode assembly of such sealed cells comprises at least two superposed, opposite-polarity, adjacent sintered electrode plates the pores of which are loaded with active electrode substance, and electrolyte held immobilized or absorbed in pores of the electrode plates and in the pores of the non-conducting or insulating separator layer interposed between the electrode plates. Notwithstanding the limited volume of corrosive alkaline electrolyte, difficulties have been encountered in the past with such sealed cell because of the creepage of the corrosive electrolyte through the casing joints. In all prior sealed alkaline battery cells, the insulating casing seal was formed by crimping and sealingly clamping under pressure, the edge region of the metallic cell casing over the adjoining edge region of the metallic cover wall and an overlying sealing gasket or plastic insulating material to provide the best possible liquid-tight insulating seal between the two adjoining casing walls. In the operation of such sealed cells, difficulties have been encountered due to leakage of corrosive electrolyte through their insulating sealing joints, and they frequently fail due to short-circuits, deterioration and the like.

Among the objects of the present invention is a sealed alkaline battery cell of the foregoing type, enclosed in a liquid-and-gas-tight metallic casing enclosure sealed with metallic fusion joints at elevated temperature, with one metallic terminal wall held insulatingly affixed to a passage region of a relatively thick, adjacent metallic casing wall by an inorganic gas-and-liquid-tight, tubular insulating member which is joined to the adjacent junction surfaces of the metallic terminal member and to junction surfaces of the thick metallic casing wall by liquid-and-tight metallic fusion joints formed at elevated temperature.

The foregoing and other objects of the invention will be best understood from the following description of exemplifications thereof, reference being had to the accompanying drawings, wherein:

FIG. 1 is a partially cross-sectional and partially diagrammatic view of one form of an alkaline battery cell exemplifying the invention;

FIG. 2 is a cross-sectional view of one form of sealed alkaline battery cell of the invention;

FIG. 3 is a transverse cross-sectional view on a greatly enlarged scale, along line 3—3 of FIG. 2, of one form of the internal electrode assembly of such cell;

FIG. 4 is a vertical cross-sectional view of an alkaline battery cell with a fusion-sealed metallic casing enclosure exemplifying the invention, the battery cell of FIG. 4 also having a controllably burstable, liquid-and-gas-tight metallic enclosure sheet, which enclosure sheet will burst when internal gas pressure developed under a large recharging current reaches a predetermined limited upper pressure level; and FIG. 5 is a vertical cross-sectional view of a fusion-sealed battery cell similar to that of FIG. 4, without the controllably burstable metallic enclosure sheet, and having a modified type of liquid-and-gas-tight metallic fusion seals between its insulated terminal member and the adjacent metallic casing wall.

Exemplifications of sealed cells of the invention herein described, have the electrode assembly enclosed in a tubular or cylindrical metallic battery casing so as to make it suitable for use in applications such as conventional flashlights, wherein one or a column of several similar battery cells, are held in superposed relation to a flashlight bulb or to another type of electrical load circuit. However, in its broader aspects the present invention is applicable to sealed alkaline battery cells having cell casings of other shapes, such as oval, rectangular, or the like, as required in different specific applications.

Referring to the cross-sectional, diagrammatic view of FIG. 1, one example of a sealed battery cell of the invention comprises an electrode assembly 20 which may consist of a pair of superposed electrode plates 22, 23 of opposite-polarity, held separated by a porous or microporous electrically-insulating separator sheet or layer 24 with the alkaline electrolyte held absorbed or immobilized in the pores of the separator 24 and of the electrode plates 22, 23. Although the cells of FIGS. 1 to 5 may operate with any known form of electrode assembly, for instance a stack of vertically superposed, alternating, opposite-polarity electrode plates 22, 23, separated from each other by electrolyte-holding insulating separators 24, the specific cells of FIGS. 2, 3 and of FIGS. 4 and 5, are shown provided with a spirally-coiled electrode assembly or core 20, an example of which is shown greatly exaggerated in cross-section, in FIG. 3.

The spirally-coiled, superposed, opposite-polarity electrodes 22, 23 of core 20 are sintered electrode plates the pores of which are loaded with active positive and negative electrode substances in any suitable way, for instance as described in Koren et al. Patent 2,708,212, and in the article, "Nickel Cadmium Battery Plates," published December 6, 1948 in the Journal of the Electrochemical Society, pages 289–299, vol. 94, No. 6. Alkaline cells of this type operate with a corrosive alkaline electrolyte such as a 20% to 35% (by weight) solution of potassium hydroxide in water. The coiled electrode assembly 20 has a generally tubular cylindrical outer surface, and it is held enclosed within the interior of a tubular, metallic casing 25 with the axis of the coiled electrode assembly 20 being generally coaxial with the axis of the tubular cell casing 25. As an example, the coiled electrode assembly may be of the type described and claimed in the co-pending application of L. Belove, Serial No. 860,-609, filed December 18, 1959 as a continuation-in-part of his application Serial No. 843,402, filed September 30, 1959, and assigned to the same assignee.

It has long been known that the corrosive alkaline electrolyte of such battery cells tends to creep or penetrate through the joints along which one or more metallic cell terminal is held insulatingly affixed and sealed to an opening region of the metallic casing wall. Such electrolyte-creepage difficulties present a critical problem in alkaline battery cells which have to be enclosed in what is known as a "sealed" metallic battery casing. In all prior sealed alkaline battery cells of this type, the insulating seal between the metallic terminal wall and the adjacent casing wall of the metallic casing enclosure, is formed by crimping the edge region of the tubular metal casing and clamping it under pressure over the adjoining edge region of the metallic terminal wall and an overlying sealing gasket or sheet of plastic insulating material interposed between them to provide the best possible liquid-tight insulating seal between the two adjoining metallic casing walls. However, in the past difficulties have been encountered with the liquid-tight insulating seal of such known sealed casing enclosures due to leakage of the corrosive alkaline electrolyte along the insulating seal-junction surfaces, short-circuits, deterioration, and related problems.

In many important applications, rechargeable alkaline cells require a metallic enclosure casing with a liquid-and-gas-tight enclosure seal having a reliability of several orders of magnitude greater than obtained with crimped insulating enclosure seals of the type described above. In applications wherein such rechargeable cell has a tubular cell casing, the tubular metallic casing wall is, as a rule, of limited thickness. As an example, in the fusion-sealed cylindrical metallic casing of a cell having dimensions of a conventional "D" cell, the side walls of the tubular casing have a thickness of about 0.30". If the metal end-wall of such D-cell holding fusion-sealed therethrough an insulated electrode terminal, has a thickness of the same order as the tubular casing wall to which it is integrally united, excessive internal gas pressure will cause outward deformation and bulging of such casing end-wall, which outward bulging results in breaking or at least impairing the liquid-and-gas tightness of the insulated fusion seal between the sealed-through electrode terminal and the surrounding outwardly bulged end-wall.

In accordance with a phase of the present invention, the tubular casing wall of the metallic casing enlcosure of a rechargeable battery cell has fusioned-joined to its open end a metallic end-wall with a substantial wall portion of a wall thickness materially greater than that of the tubular casing wall, and sufficiently great to give such metallic end-wall a resistance to deformation by internal pressure at least two orders of magnitude greater than a metallic end-wall having the thickness of the tubular casing wall; and such metallic casing end-wall has a terminal passage to which is insulatingly affixed the metallic electrode terminal by a solid, liquid-and-gas-tight inorganic insulating member which is fusion-sealed by a liquid-and-gas-tight fusion joint to the surrounding thick end-wall portion and to the insulated metallic terminal held affixed thereto. In accordance with a further aspect of this phase of the invention, such insulated metallic terminal extends through and is held affixed by such metallic fushion joint to the surrounding tubular insulating member extending through and affixed by such metallic fusion joint to the surrounding passage surfaces of the thick metallic end-wall portion.

In accordance with an aspect of this phase of the invention, the thickness of each metallic end-wall of the relatively thin, tubular, metallic casing of such rechargeable cell, is at least twice the thickness of the tubular casing side wall, and the end-wall resistance to deformation by internal pressure is several orders of magnitude greater than a metallic end-wall having the thickness of the side walls, with both thick metallic end-walls being fusion-sealed to the opposite open ends of the tubular casing, and a terminal passage at least one thick end-wall insulatingly holding fusion-sealed thereto an insulated electrode terminal connected to one of the cell electrodes.

In accordance with a further aspect of this phase of the invention, the insulated terminal member has the shape of a tubular metallic body having a tubular surface which is affixed by such metallic fusion joint to a tubular junction surface of such tubular insulating member. In accordance with a still further aspect of this phase of the invention, the interior space of such tubular metallic terminal is connected as through an opening, to the exterior space, and its inner open metallic tubular end has joined thereto by a liquid-and-gas-tight fusion joint, a deformable, thin metallic sheet of high density and gas-and-liquid tightness, the deformable metallic sheet having a sheet section that is sufficiently thin to cause bursting or breaking open thereof under predetermined level of internal gas pressure developed in the casing.

In accordance with the invention, the relatively thin, tubular casing wall of the integral, liquid-and-gas tight metallic casing enclosure of such sealed alkaline battery cell containing only a limited amount of electrolyte, has a relatively thick metallic end-wall of at least twice the thickness of the tubular casing wall, and the metallic terminal is held insulatingly affixed to a passage in the thick end-wall by a liquid-and-gas-tight tubular insulating member having two tubular, mutually insulated junction surfaces, which are joined by liquid-and-gas-tight metallic fusion joints to the thick end-wall passage and to the metallic terminal, respectively.

The tubular cell casing 25 is of metal, and although shown in cylindrical shape, it may have rectangular or other shapes. The tubular casing 25 has an integral bottom wall 26, and its top casing opening is hermetically closed by a metallic end-wall 27 which is fused by a metallic fusion joint 33 at elevated temperature to the adjacent top edge of the tubular metallic casing 25. The metallic top end-wall 27 is several times thicker than the tubular casing wall 25. Within a passage of the thick end-wall 27 is held a metallic cell terminal 28 which is insulated from the surrounding thicker wall region 29 of the thick top wall 27 by a surrounding tubular insulating sealing and junction member 31. The insulating sealing and junction member 31 is of highly dense, solid, inorganic liquid-and-gas-tight insulating material such as glass or ceramic material of the type used in making gas-tight envelopes for vacuum amplifier tubes or analogous gas-tight envelopes or casings. The metallic top end-wall 27 is shown as having an upwardly-extending rim 32, and is shaped to fit within the upper edge of the cylindrical cell casing 25. The superposed, opposite-polarity electrode plates 22, 23 of the battery cell are connected, respectively, to the insulated upper metal terminal member 28 of the thick top-end-wall 27, and to a wall portion of the tubular metal casing 25. In the form shown, the positive electrode plate 22 is shown connected through a metallic connector strip or tab 44 to the inward face of the insulated metallic terminal 28 of the thick top end-wall 27 of the casing. The opposite-polarity negative electrode plate 23 is connected through a strip or metallic tab 45 to the metallic bottom wall 26 which forms an integral part of the tubular metal casing 25 of the cell.

The upper metallic cell terminal 28 is shown insulated by a relatively thick insulating collar 31 of solid gas-and-liquid-tight glass or ceramic material, from the surrounding metallic wall portion 29 of the thick metallic wall 27 of the cell casing 25. The insulating junction is joined by fusion at elevated fusion temperature to the outer surface of the surrounded metallic terminal member 28 and to the surrounding surface of the passage of the thicker central wall portion 29 of the thick metallic end-wall 27, by fusion at elevated temperature at which the insulating collar 31 is fused at elevated temperature along facing junction surfaces to the surrounded metallic terminal 28 and to the surrounding metallic passage surfaces of thick end-wall 27.

After assembly of the cell components, the rim edge 32 of the thick metallic top end-wall 27 and the surrounding upper edge of the tubular cell casing 25 are fused to each other by fusion at elevated temperature at which the adjoining metallic wall edge portions melt and fuse into a liquid-and-gas-tight fusion joint 23 which joins the thin, tubular casing 25 and its thick end-wall into an integral liquid-and-gas-tight metallic casing enclosure for the electrode assembly.

Without thereby limiting this phase of the invention, there will be given below, data of a practical battery cell having such hermetically tight cell casing with the insulated terminal and all wall portions of the casing joined to each other by fusion into a liquid-and-gas-tight, fused, integral cell casing structure. The cell casing 25 and its top wall 27 may be formed of cold-rolled steel and thereafter plated or coated with an adhering coating of nickel, since each battery cell is designed for operation with nickel-cadmium electrodes operating with a corrosive alkaline electrolyte. The central terminal member may be formed of a nickel-iron alloy containing 50% nickel and 50% iron, or of a nickel-iron-cobalt alloy such as distributed under the trade-name "Kovar." The inorganic collar 31 is formed of gas-tight borosilicate glass, such as known in the trade as "Corning 9010," which has a melting temperature below 1000° C. Before fusing the insulating collar 31 to the metallic members 27, 28, they are oxidized by heating them within an oxidizing atmosphere.

The insulated metallic terminal member 28 is then assembled with the surrounding glass insulating collar 31 within the passage of the thick cell top end-wall 27 in a suitable jig, for instance of graphite. The end-wall assembly is then passed with the jig through an oven wherein it is heated to a temperature at which the glass of the insulating junction loop 31 fuses with the facing oxidized surfaces of the terminal member 28 and top wall member 27, thereby forming an integral top wall having an electrically insulating, liquid-and-gas-tight, hermetically fused sealing junction 31 between the thick metallic casing end-wall 27 and its metallic terminal 28. The oxide coating previously formed on the metallic end-wall 27 and its metallic terminal member 28, is then removed from the remaining major exposed surfaces thereof by a suitable treatment, for instance by a treatment with hydrochloric acid, leaving the cell top wall 27 and its terminal member 28 with a clean exterior metallic surface.

The coiled, sintered electrode assembly with its insulating separators is then positioned within the cell casing 25. Before assembling and coiling them, the opposite edge regions of the two opposite-polarity electrodes 22, 23 are provided with outwardly-projecting metallic electrode tabs, of flexible nickel sheet, for instance, the inner ends of which are welded to edge regions of the respective electrode plates, for instance, so that the coiled electrode assembly has an upward-extending positive terminal tab 44 from the positive cell electrodes 22, and a downward-extending terminal tab 45 from the negative cell electrodes 23. After positioning the electrode assembly with the cell casing 25, the end of the downwardly-extending electrode tab 45 is welded to the central region of the cell casing bottom wall 26, and its upwardly-projecting electrode tab 44 is similarly welded to the inwardly-facing surface portion of upper metallic terminal member 28. A measured volume of alkaline electrolyte is then poured into the cell so as to fill the pores of the separators 24 and the pores of the electrode plates 22, 23 with the electrolyte. Thereupon the cell casing top wall 27 is placed or fitted between the upward edges of the tubular or cylindrical walls of cell casing 25 so that the upwardly projecting edge rim of the top casing wall 27 is substantially at the same level as the surrounding edge of the side walls of cell casing 25, being held therein by their interfitting contact engagement. Thereupon, the upwardly-facing, interfitting, upwardly-extending edge of the rim of the cell top wall 27 and the surrounding side wall edge of cell casing 25, are molten and fused to each other into a liquid-and-gas-tight fusihon joint 31, with the thick metallic end-wall 27 and the tubular casing 25 fused into a continuous, integral liquid-and-gas-tight metallic casing enclosure for the electrode assembly or core 20.

To prevent loss of electrolyte from the electrode core 20 when fusing at elevated temperature, the interfitting junction edges of the casing 25 and the thick top wall 27, the cell casing assembly is held seated within the opening of a massive metallic jig engaging and surrounding the upper region of the cell casing 40 underlying its upper edge, which metallic jig is cooled, for instance by circulating through it a cooling liquid such as water, or evaporating thereon the cooling liquid while the interfitting upper edges of the cell casing 25 and its top wall 27 are fused to each other. In practice, good results are obtained by rotating the jig with the cell casing assembly held therein, and maintaining a constricted, pencil-like torch arc in a protective gaseous medium such as helium or argon, between the top of an arc electrode and an adjacent edge portion of the rotating edge of the cell casing assembly, for instance by a constricted torch-arc apparatus as described in Oyler et al. Patent 2,884,510, and the literature describing the operation of commercial torch arc apparatus of this type.

The metallic casing 25 and metallic terminal 28 may be formed of any metal which resists corrosion when continuously subjected to alkaline electrolyte, such as stainless steel, nickel, and the like. If stainless steel is used for the casing walls, it is of advantage that it should be of a non-magnetic type, so that such sealed cell may be used adjacent magnetic field structures without any mutual magnetic interlinkage. However, the casing and the terminals may also be formed of other metals provided all surfaces of such metal casing and terminals which are exposed to the electrolyte, are coated with a continuous, adhering metal coating of metal which resists corrosion by alkaline electrolyte, such as nickel.

As stated before, the metal of the cell casing 25 and of the casing top wall 27 are of conventional cold-rolled steel which has been plated with an adhering nickel coating. In practice, after first forming the cell casing 25 and its top wall 27 in the desired final form, such as shown in FIG. 1, a large quantity of such casing parts are nickel-plated in a conventional nickel-plating bath. In such conventional nickel-plating process, the edges of the steel casing 25 and of the steel top wall 27 have electrode-posited thereon a much thicker or higher deposit of nickel than is deposited along the other surface portions of the so-plated casing parts. When forming the fused weld joint 32, between the interfitting upward edges of the cell casing 25 and its top wall 27, the larger amount of nickel previously electrodeposited on the fused edges, diffuses in the molten steel of the fused casing edge portions, thereby enriching the fused steel edges 32 of each cell casing with nickel and providing each fused casing edge 32 with the desired protection against oxidation. There is thus obtained a hermetically sealed, rechargeable alkaline battery cell wherein the electrode assembly and corrosive electrolyte are hermetically enclosed in a gas-tight, integral, metallic casing having at least one metallic electrode which is insulatingly joined by fusion of an insulating sealing junction loop of high-density, inorganic material at elevated temperature, to the casing and terminal portions which it joins, with the casing having two or more complementary casing sections for enabling the electrode assembly to be assembled therein, the junction portions of complementary casing parts being joined by fusion at an elevated fusion temperature to provide a hermetically sealed cell casing, all joints of which are sealed by fusion.

The electrode assembly of such cell casing may be formed of any type of superposed, porous, properly-loaded sintered metal-powder plates which are separated by an electrolyte-holding porous separator sheet or layer of electrically insulating material such as filter paper. For instance, the electrode assembly may consist of a stack of sintered and loaded electrode plates of one polarity alternately superposed over electrolyte-holding separators and electrode plates of opposite polarity, in the manner shown, for instance, in U.S. Patents 2,379,374 and 2,527,888, or British Patent 214,799 of 1924.

In the form of the battery of the invention shown in FIGS. 1 to 4, the electrode assembly is formed of two superposed electrode plates 22, 23 of opposite polarity, and an interposed electrolyte-holding separator sheet 24, which are coiled into a spirally-coiled plate assembly containing at least one-half of one coil turn. By way of example, the specific battery cell shown, has the size of a conventional "D" dry cell, and its electrode assembly contains such superimposed, opposite-polarity electrode plates 22, 23 coiled into five coil turns fitting tightly within the interior compartment space of the tubular casing 25, and the electrically-conductive outer surface of the outer coil turn of negative electrode plate 23 may make metallic contact with the surrounding inner metallic surface of tubular or cylindrical cell casing 25. In the battery cell shown, the coiled electrode plate 22 is loaded with positive electrode material and constitutes the cell anode, and the coiled, opposite-polarity electrode plate 23 is loaded with negative electrode material and constitutes the cell cathode. The co-pending application Serial No. 843,402, filed September 30, 1959, by L. Belove, and assigned to the same assignee, referred to hereinabove, describes in more detail such spirally-coiled electrode assembly and its disclosure is assumed to be considered a part hereof.

Sealed, alkaline cells of the type described above may, is most cases, be recharged without developing excessive gas pressure, provided the recharging current remains below a limited current level. However, in some cases, when recharging such sealed, rechargeable alkaline cells, an excessively high internal gas pressure is developed in interior, which gas pressure is sufficient to cause uncontrolled or explosive bursting of the cell casing 25.

In many important applications, rechargeable alkaline cells require a metallic enclosure casing with a liquid-and-gas-tight enclosure seal having a reliability of several orders of magnitude greater than obtained with crimped insulating enclosure seals of the type described above. In accordance with the principles of the invention, the metallic enclosure casing of rechargeable battery cells having an insulating enclosure seal of such very high order of reliability, is obtained by providing the electrode assembly and its small volume of electrolyte with an integral liquid-and-gas-tight metallic enclosure casing wherein at least one metallic terminal is insulated from the surrounding metallic casing wall by a solid, liquid-and-gas-tight, inorganic insulating junction member having metallically-fused, liquid-and-gas-tight junctions with adjacent surface portions of both the surrounded metallic terminal and the surrounding metallic casing.

In applications wherein such rechargeable cell has a tubular cell casing, the tubular metallic casing wall is, as a rule, of limited thickness. As an example, in the fusion-sealed cylindrical metallic casing of a cell having dimensions of a conventional "D" cell, the side walls of the tubular casing have a thickness of about 0.30". If the metal end-wall of such D-cell holding fusion-sealed therethrough an insulated electrode terminal, has a thickness of the same order as the tubular casing wall to which it is integrally united, excessive internal gas pressure will cause outward deformation and bulging of such casing end-wall, which outward bulging results in breaking or at least impairing the liquid-and-gas tightness of the insulated fusion seal between the sealed-through electrode terminal and the surrounding outwardly bulged casing end-wall.

FIG. 4 is a cross-sectional view similar to FIG. 2, of a sealed alkaline battery cell having a casing enclosure representing one embodiment of the just hereinabove described phases of the present invention. Although it may operate with any known form of electrode assembly, for instance with a stack of vertically superposed, opposite-polarity electrode plates, the cell of FIG. 4 is shown provided with a spirally-coiled electrode assembly 20 identical with those described above in connection with FIGS. 1-3. The coiled electrode assembly 20 of FIG. 4 has a coaxial, hollow central passage 51 and overlapping side end-portions of its electrolyte-holding insulating separators 24 project outwardly beyond the bottom and upper side edges of the superposed, spirally-coiled, opposite-polarity electrodes plates 22, 23. One electrode tab, namely the negative electrode tab 45, extends downwardly from the bottom edge of the coiled negative electrode plate outwardly beyond the assembly, and the positive electrode tab 44 extends outwardly from the upper edge of the positive plate beyond the electrode assembly 20.

The electrode assembly 20 with its two oppositely-extending, opposite-polarity electrode tabs 44, 45, is enclosed in a liquid-and-gas-tight metallic casing enclosure shown as comprising a tubular metallic casing 61 having a bottom end-wall 62 and a top end-wall 65, both of liquid-and-gas-tight metal. In the form of cell shown, the top end-wall 65 and also the bottom end-wall 62, have a wall thickness several times greater than the wall thickness of the tubular casing wall 61, so that when the two end-walls are fusion-sealed (as described below) to the thin-walled tubular casing 61, excessive pressure developed in the interior of the sealed casing enclosure will bring about the deformation of the tubular wall 61 before causing deformation of at least the upper end-wall 65, or both end-walls 65, 62.

In the form shown, the thick, bottom end-wall 62 has a thinner, outwardly-projecting tubular rim 63 of about the wall-thickness of the surrounding tubular casing wall 61. The outer edge region of end-wall rim 63 is joined to the surrounding edge of the tubular casing wall 61 within which it fits, by a metallic fusion seal 64 at elevated temperature. In practice, a gas-tight, integral, metallic fusion seal between the end-wall rim 63 and the surrounding edge region of the tubular casing 61, is obtained by maintaining a constricted, pencil-like electric torch arc in a protected gaseous medium such as helium or argon, between the tip of an arc electrode and adjacent portions of the rotating edges of end-wall rim 63 of the surrounding tubular casing 61, for instance, by a constricted torch-arc apparatus as described in Oyler et al. Patent 2,884,510, and the literature describing the operation of commercial torch-arc apparatus of this type.

In the specific form shown, before placing thereon and fusion-joining thereto the top-wall 65, the liquid-and-gas-tight metallic, tubular casing 61 having its bottom end enclosed by an integral, liquid-and-gas-tight metal bottom wall, for instance as described above, has placed in its interior space an electrode assembly 20, as indicated in FIG. 4. As an example, the electrode assembly 20 may be identical with that described above in connection with FIGS. 1 to 3. A strong, insulating sheet 49 of suitable synthetic resin material, such as nylon, having a slot through which the negative bottom electrode 45 has been passed, underlies the bottom end of the electrode assembly with its downwardly-protruding insulating separator sheets 24. A central opening in the insulating sheet 49 is aligned with the hollow interior passage space 51 of the electrode assembly. The interior of the upper portion of tubular casing wall 61 has welded thereto, as by conventionally shown spot-welds, an auxiliary, thin, flexible metal tab strip 45—7 of sufficient length to enable ready welding its upper tab-end to the end of a tab extension 45—6 extending from the negative bottom electrode tab 45 underlying the central bottom region of electrode assembly 20 and its bottom insulating sheet 49. The auxiliary tab 45—7 may have a length extending beyond the upper edge of the tubular casing 61 so that it may be bent and held outwardly over the open casing top edge while inserting the electrode assembly 20 as a unit into the interior position shown, with the negative tab extension 45—6 held aligned with the casing tab 44—7 until the electrode assembly 20 has reached its innermost position shown. Thereupon, the upper end of the negative electrode tab extension 45—6 is welded, as by a spot-welding junction 45—8, to the overlapping adjacent portion of casing tab 45—7, whereupon the excess length of casing tab 45—7 is cut off. An insulating sheet-strip 29—3 of suitable material and having greater width than the negative tab extension 45—6 and auxiliary tab 45—7, is interposed between the tab extension 45—6 and underlying side surface of the electrode assembly 20, to prevent any inadvertent damage to its exterior when inserting the electrode assembly into the interior casing position shown.

After so-inserting the electrode assembly 20 into its interior casing position and completing the wall junction between casing tab 45—7 and negative tab extension 45—6, the welded tab-end junction 45—8 is folded over the top of the electrode assembly 20 and the underlying folded-down upper end of insulating separator strip 20—3, for instance, as seen in FIG. 4.

The features of invention relating to an elongated coiled electrode assembly enclosed in a sealed tubular casing, with one-polarity metallic connector tab extending from one end of the electrode assembly being connected to an insulated metallic end-wall portion of the tubular casing and the metallic connector tab of the opposite-polarity electrode extending from the opposite assembly end being connected to a tubular casing portion that is nearer to the one-polarity side are not part of the present invention and are claimed in copending application Serial No. 120,-458, filed May 10, 1961 by Harold Field and Mary Daria, and assigned to the same assignee.

It should be noted that the portion of the negative electrode tab 45 underlying the central hollow space 51 of the electrode assembly 20 is electrically welded by spot-welding to the underlying portion of bottom end-wall 62, as indicated by the applied welding symbols (XXX). In its original form, the thick metallic casing top-wall 65 is shaped to fit within the open casing end, and has a relatively thin, outwardly-projecting rim 66 of about the same small thickness as the surrounding end region of the tubular metallic casing wall 61. The outer edge region of top-wall rim 66 is fusion-joined to the surrounding edge region of tubular metallic casing wall 61, within which it fits by a liquid-and-gas-tight metallic fusion joint 67 at elevated temperature, for instance by a metallic arc torch weld, as described above in connection with making the similar fusion-weld 64 of the bottom wall rim 63 to the surrounding casing edge.

Within an axial passage, for instance in the central region of thick, metallic wall 65, is held affixed a metallic member terminal 71 which is insulated from the surrounding metallic casing wall 65 by a surrounding loop-shaped insulating member or junction collar 74. Although it may be rod-shaped, the metallic terminal member 71 is shown formed of a tubular, metallic wall which may have a terminal end-wall 72 at the top. The insulating junction collar 74 may be formed of any known liquid-and-gas-tight inorganic material which may be joined by liquid-and-gas tight fusion joints to an adjacent metallic wall portion, such as dense, alkali-resisting ceramic bodies or dense, alkali-resisting glass bodies. In the form shown, the insulating junction collar 74 is formed of a relatively thick, ceramic body of high density and high resistance to corrosion by the alkaline electrolyte of the battery cell. As an example, good results are obtained with an insulating ceramic junction collar 74 consisting of high-density, fired and matured ceramic solids containing 94% to 96% of alumina or aluminum oxide ($Al_2O_3$). Good results are also obtained with dense ceramic bodies consisting pricipally of zircon or a combination of zircon and alumina. Alternatively, the dense, ceramic body of the insulating collar may consist of fosterite of the type described in U.S. Patent 2,912,340, as desirable for making vacuum-tight ceramic junction bodies for evacuated electronic apparatus and similar ceramic bodies.

The tubular ceramic junction collar 74 is joined by an outer, fused, liquid-and-gas-tight metallic junction layer 75 to the extended surrounding surface of thick metallic wall 65, and by a similar fused metallic junction layer 76 to the surrounded surface of the tubular terminal member 71. Any of the known processes for forming liquid-and-gas-tight or hermetic, fused, metallic junctions between a ceramic body and an adjacent metal body, may be used in forming the fused ceramic-metal junctions 75, 76. In one process, known as the "Telefunken" process, the cleaned surface of the ceramic body which is to be joined to the metal, has applied thereto a thin coating of fine metallic powder consisting of molybdenum mixed with manganese, held in a suitable coating medium such as nitrocellulose lacquer. The so-coated ceramic body is heated, for instance for half an hour at 350° C. under a protective atmosphere of nitrogen, for instance, wherein the applied molybdenum-manganese powder becomes united as a continuous, liquid-and-gas-tight, thin stratum to the underlying ceramic region.

The so-formed, minutely-thin metallic surface stratum or strata of the ceramic junction collar 74 may then be joined by a suitable brazing metal to the facing metal surface of end-wall 65 and to the facing surface of tubular terminal member 71, to form therewith a strong liquid-and-gas-tight fused metal junction 75, 76. Any of the known alkali-resisting brazing metal compositions that have been used in the past for such ceramic-to-metal hermetic junctions, may be used for forming the brazed junctions between the metallized surfaces of the ceramic junction collar 74 and the surrounding and surrounded metal body portions of the top wall 54. Brazing junctions of an extremely high order of reliability are obtained by forming them of a eutectic brazing-alloy composition, consisting of nickel and gold having a melting temperature of about 1742° F.

In another fusion-junction process for forming hermetic ceramic-to-metal joints, known as the "Bondley" process, the metallized surface of the ceramic body is formed either with titanium hydride or with zirconium hydride. As an example, fine titanium hydride powder may be mixed with a suitable binder such as nitrocellulose lacquer, and is applied as a thin stratum to the ceramic surface. The so-coated ceramic body is then heated to a temperature in the range between 1100° C. and 1300° C. under vacuum, at which the titanium hydride decomposes and the titanium content becomes united as a gas-and-liquid tight stratum to the underlying ceramic body region in the presence of the pure hydrogen evolved by the hydride. The so-formed titanium stratum or strata of the ceramic junction collar 74 may then be joined to adjacent metallic surfaces of terminal wall 65 and the surrounded surface of terminal member 71 by a brazing compound, as described above for the molybdenum-manganese metallized junction surfaces.

Into the open upper end of the tubular casing 61 of a fusion-sealed battery cell such as shown in FIG. 4—holding therein and having joined thereto the electrode assembly or core 20—is inserted the previously produced, thick metallic end wall 65 with its insultangly held tubular metallic terminal 71. The thick end-wall 65 with its outward rim 66, has a sliding fit within the upper casing opening of tubular casing wall 61, so that the upper edge of end-wall rim 66 may be held aligned with the surrounding upper edge of tubular metal casing 61. Thereupon, the outer edge of upper end-wall rim 63 is joined to the surrounding edge of the tubular casing wall 61 by a liquid-and-gas-tight, strong metallic fusion seal 67 at elevated temperature, similar to the casing fusion-joint 63 of bottom wall 62. This may be done by applying a constricted, pencil-like torch arc in a protective gaseous medium between the tip of an arc electrode and adjacent portions of rotating edges of end-wall rim 66 and the surrounding tubular casing 61, while the casing 61 with upper end-wall 65 are being rotated. The electrode assembly 20 of the tubular casing 61 contains only a limited amount of electrolyte held absorbed in the pores of the insulating separators 24 and of the sintered, loaded, opposite-polarity electrode plates. To prevent loss of the limited amount of electrolyte which has to be retained with the interior of the fusion-joined, metallic casing enclosure 61, the top-wall fusion joint 66 is formed with pencil-like torch arc while the cell casing 61 with its top wall 65 are held clamped and rotated in a massive metallic jig which is cooled to keep cell casing 61 and its electrode assembly cool and suppress evaporation of the electrolyte by the applied torch heat. Such rotating metallic jig may consist of two complementary, heavy, metallic jig sections clampingly engaging the upper section of the tubular casing 61 along its entire exterior periphery. The interior electrode assembly is kept cool by having the rotating metallic jig cooled by a circulating cooling liquid or by evaporating thereon a cooling liquid, while the rotated top-wall rim edge 66 is fused with the pencil-like torch arc to the surrounding edge of casing 61 which forms one terminal of the torch arc circuit. The torch-arc apparatus used for making such fused, integral, liquid-and-gas-tight metallic casing junction 67, may be of the same type as used for making the fused metallic junction 64 between the bottom end-wall rim 63 and the surrounding casing edge.

All metallic wall portions of the casing enclosure of the cell described in connection with FIG. 4 and with FIGS. 1–5, are made of a strong metal which resists corrosion by alkaline electrolyte. Good results are obtained by making the cell casing 61 of FIG. 4, and the corresponding cell casings of FIG. 2, of conventional cold-rolled steel which is liquid-and-gas-tight, and the exterior of which has been plated with an adhering nickel coating. The two thick end-walls 62 and 65 of FIG. 4 are likewise formed of dense steel and are electroplated with a tightly-adhering nickel coating. The top-walls 26 and 26–3 of the cells of FIGS. 2 and 4, respectively, are also formed of such nickel-plated, strong sheet members of cold-rolled steel.

When the tubular cell casing 61 and its two metal end-walls 65, 62, and tubular terminal 71, are electroplated with nickel in a conventional nickel-plating process, the casing edges of the steel casing 61 and tubular terminal 71 and also the end-wall rim edges 66 and 63 have deposited thereon a much thicker adhering nickel coating deposit than the other extended surfaces of the plated casing parts. When forming the fused weld joints 67 and 64 between the interfitting rim edges of the two end-walls 65, 62 and surrounding edges of tubular casing 61, the larger amount of nickel previously electrode-posited on these metal edges is melted, and the molten nickel diffuses into the molten metal forming the fused edge junctions 67 and 64, thereby providing therewith the desired protection against oxidation. There is thus obtained a liquid-and-gas-tight metallic casing enclosure for the electrode assembly 20 holding hermetically sealed within the fusion-joined metallic casing enclosure the limited amount of electrolyte held in the pores of the electrode assembly, with one metal terminal held insulated from the surrounding casing metal walls and joined thereto by liquid-and-gas-tight fused metal joints.

There are applications wherein a fusion-sealed metal casing enclosure of an alkaline battery cell has to have an extremely high order of reliability during a long life under severe operating conditions. In practice, it has been found that in applications requiring such high order of reliability, good results are obtained by using nickel for all metallic elements of such cell casing enclosure, such as the tubular casing 61, the two end-walls 65, 62, and the insulated terminal 71.

Alkaline battery cells having a liquid-and-gas-tight casing enclosure with all metal insulating junctions formed with liquid-and-gas-tight fusion joints, such as described above in connection with FIG. 4, may be recharged without developing excessive internal gas pressure, provided the recharging current remains below a limited current level. However, in some cases when recharging such fusion-sealed alkaline cells, an excessively high internal gas pressure is developed in the casing interior, which gas pressure may cause uncontrolled or explosive bursting of cell casing 61. In accordance with the invention, the liquid-and-gas-tight metallic casing enclosure of an alkaline battery cell having fusion-sealed, liquid-and-gas-tight joints, such as described above in connection with FIG. 4, has the interior space of the tubular terminal member, such as terminal member 71 of FIG. 4, connected to exterior space, for instance as by an opening 77, and the interior open end of the tubular terminal member facing the interior of the casing enclosure has joined thereto by a metallic fusion joint a thin enclosure sheet, which is liquid-and-gas-tight and which is sufficiently thin to assure that it bursts or breaks open under predetermined upper level of internal gas pressure developed when recharging the electrode assembly 20. As an example, good results are obtained with a thin, rolled-metal enclosure sheet of a soft or hard grade of nickel having an intermediate central section or being throughout of a sufficiently small thickness as to cause such sheet to burst or break open under limited pressure such as exceeding 500 p.s.i. In practice, good results are obtained with enclosure sheets or rolled, soft nickel having a thickness in the range of about 0.006″ to 0.001″.

In accordance with the invention, the tubular terminal wall 71 of an alkaline cell such as shown in FIG. 4, and held insulated from the surrounding metallic casing walls by an inorganic insulating member or collar joined thereto by metallic fusion joints, has along its inwardly-facing, open end, a laterally-tapering rim 78 to which is joined by a metallic, gas-tight fusion joint, the periphery or rim of a thin, liquid-and-gas-tight, controllably burstable metallic enclosure sheet 81. The fusion joint between the liquid-and-gas-tight fusion joint between the rim edges of thin metallic enclosure sheet 81 and the adjacent edges of tubular terminal rim 78, may be formed by an arc torch pencil. In such case, the peripheral rim of the thin enclosure sheet 81 is given about the same thickness as the tubular terminal rim 78, for instance by forming it out of a sheet which has about the same thickness of the tubular casing rim 78, and the center portion 81 of such enclosure sheet is compacted, as by coining, to the required small thickness, for instance, 0.001″ or somewhat thicker, depending on the selecting bursting pressure at which the thin central sheet portion 81 is to burst open for releasing gases from the interior of the liquid-and-gas-tight casing enclosure which it forms with the tubular casing 61 and its bottom casing wall 62.

Alternatively, the peripheral regions of an enclosure sheet 81 which has the same small thickness throughout its width, is joined by a metallic fusion-braze to the overlying inner rim 78 of tubular terminal member 71. The brazing composition described above for forming the liquid-and-gas-tight brazing joint 76, 75 between the metallized surfaces of the ceramic insulating collar 74 and the adjacent metal bodies 65, 71 of the top end-wall may be used for forming the brazing junction between the periphery of the thin, burstable enclosure sheet 81 and the overlying rim 78 of tubular terminal 71, for instance, a eutectic brazing alloy consisting of nickel and gold, having a melting temperature of about 1472° F., which provides a high-reliability brazing joint.

The periphery or rim of the controllably-burstable enclosure sheet 81 of the top-wall tubular terminal 71 is brazed to the terminal wall rim 78 as a part of forming the top end-wall 65 with its insulated tubular terminal 71, by the procedure described above, and before such completed terminal end-wall-65 has been placed within the open end of the tubular casing 61 for fusion-joining them into the finished encased cell, such as seen in FIG. 4. The laterally-extending metal rim 78 of the tubular terminal 71 of top end-wall 65, is shown also provided with a lateral terminal tab 79, to which the end of the flexible, upper, metallic electrode tab 44 of the electrode assembly is metallically joined, as by the conventionally indicated spot-weld joints (XXX). The weld between rim tab 79 of tubular terminal 71 and the tab end of positive electrode tab 44, is formed while the top end-wall 65 is held in raised position above the open top edge of tubular casing 61, making it possible to assure that the formed spot-weld junction may be examined for reliability. As seen in FIG. 4, an insulating sheet 46—1 of synthetic resin material, such as nylon, is interposed between the top end of the electrode assembly 20 and the overlying metallic electrode tab 44 with its weld connection to rim 79 of tubular terminal 71 and the thin, controllably burstable enclosure sheet 81 metallically fused thereto. A similar insulating sheet barrier formed of two insulating sheets 46—2, 46—3, is shown interposed between the bottom surface of the metallic top-end wall 65 with its fused, burstable, thin metal enclosure sheet 81, and the positive electrode tab 44 welded thereto.

The two overlapping insulating sheets 46—2, 46—3, may each have a central sheet opening fitting around the inner cylindrical portion of tubular terminal wall 71, with a radial slot extending from the central sheet opening of each insulting sheet, so as to permit their insertion along their slots in overlapping relation to their inner positions seen in FIG. 4, after fusion-joining the tubular terminal rim 78 to the underlying controllably burstable metallic enclosure sheet 81 and the spot-welding of rim tab 79 to the end electrode tab 44.

It is to be understood that a fusion-sealed casing of an alkaline battery cell wherein the fusion-sealed electrode assembly of the type described above in connection with FIG. 4, having a controllably burstable liquid-and-gas-tight metal enclosure sheet 81, may have the insulated tubular terminal 71 provided with a downwardly-pointing piercing projection such as indicated by dash-line 72—1 for causing the pressure-deflected thin metal enclosure sheet 81 to be pierced upon deflection by internal gas pressure at a predetermined level.

It is also to be understood that except in cases which require a controllable excess-pressure release, sealed alkaline battery cells with fusion-sealed casing enclosures of the type described above in connection with FIG. 4, will not have the thin, controllably-burstable enclosure sheet 81. In all such battery cells, the tubular terminal member 71 has no openings or connections to the exterior space, but is liquid-and-gas-tight throughout and forms part of the liquid-and-gas-tight, fusion-sealed casing enclosure for the enclosed electrode assembly 20. In all such fusion-sealed battery cells, the tubular terminal member 71 may be made without its bottom rim 78, and the end of the positive electrode 44 is metallically connected as by welding to an upper portion of the liquid-and-gas-tight tubular terminal 71, for instance to the interior surface of its upper end wall.

In accordance with a phase of the invention, fusion-sealed battery cells of the type described in connection with FIG. 4, have the strong, metallic casing and the surrounded, relatively hard electrode assembly or core subjected to a scoring operation which forms in them, one or more inwardly-recessed interlocking deformations extending along portions of or along their entire periphery for establishing interlocking engagement between the so-formed inward casing projecting and the core recess engaged thereby, and thereby prevent relative motion between the cell casing and the cell core when the cell is subjected to vibratory action. As an example, the tubular casing 61 and the surrounded hard exterior body of the electrode 20 of the battery cell shown in FIG. 4, is deformed along one or more tubular casing regions, for providing the casing with one or more inward casing projections 61—6 each engaging a corresponding inward core recess 20—6 of electrode core 20 and thereby establishing interlocking projection-recess engagement between casing 65 and cell core 20 which prevents or suppresses their relative motion when subjected to vibratory action.

Without thereby limiting the scope of the invention, there are given below data of a typical sealed, rechargeable battery cell of the type described above in connection with FIGS. 2 and 4, having the size of a conventional D-cell, with outer diameter of its cylindrical cell casing being 1.307". The wall thickness of the tubular cell casing is .028", and may be formed with an integral bottom wall of the same thickness. In the tubular metallic cell casing of such D-type cells which require a thick, metallic bottom end-wall, the bottom wall is .078", and its rim is .032" high and .028" thick, with the rim together with the wall thickness having an over-all height of .110". The thick metallic top end-dall (such as 65 in FIG. 4) is .124" thick, and its outer rim is .032" high and .028" thick. The diameter of the cylindrical passage in which the tubular insulating member 74 is affixed, is .48". The cylindrical ceramic insulating member 74 has an axial height of .110", and its internal diameter is .316", its external diameter being .475", and at least 94% of its content consisting of alumina.

The cylindrical junction surfaces are metallized with a thin stratum of a molybdenum-manganese alloy which is electroplated with a thin, adhering coating of nickel. The tubular metallic terminal 71 is formed of liquid-and-gas-tight sheet metal .020" thick. All metallic parts of the cell casing of the rechargeable cell of the type described in connection with FIG. 4, may be formed of non-magnetic steel which is coated with a thin, adhering coating of nickel. Alternatively, all metallic parts of the cell casing of the rechargeable battery cell of FIG. 4, may be formed of non-magnetic stainless steel such as type 304 liquid-and-gas-tight stainless steel sheet. For rechargeable batteries requiring a very high order of reliability, all metallic parts of the cell casing are formed of nickel, and the insulated metallic terminal member 71 is formed of an alloy of Ni, Co and Fe, which is commercially available under the trade-name "Kovar." The tubular metallic casing wall of such cell casing having a thickness of .028" will burst only at extremely high internal pressure, such as in the range of 2200 to 2500 p.s.i. The metal top end-wall having a thickness of .125", will burst only under similar high internal gas pressure.

In accordance with a phase of the invention, a fusion-sealed, liquid-and-gas-tight metallic casing enclosure of a sealed alkaline battery having a thick, metallic end-wall with an insulated metallic terminal joined by a liquid-and-gas-tight, fusion-sealed tubular insulator to a passage in such thick end wall, is given only a predetermined thickness greater than the side-wall thickness, so as to cause such end-wall to deform under predetermined high internal pressure, such as 1000 p.s.i. or in general 1000 to 1500 p.s.i., and materially smaller than the bursting pressure of the tubular metallic casing wall, for thereby impairing or fracturing the fusion-junction between the tubular insulating member and the so-deformed thick metal end-wall and permit escape of enclosed gases through the so-impaired fusion-junction.

FIG. 5 shows one form of a fusion-sealed, metallically encased alkaline battery cell exemplifying this phase of the invention. The cell of FIG. 5 is similar to that described in connection with FIG. 4 (without its controllably burstable enclosure sheet). Its electrode assembly or core 20 is enclosed in a similar tubular metallic casing 61 of relatively small thickness. The upper opening of tubular casing 61 is sealed by an end wall 82 of much greater thickness than the thickness of tubular casing 61, and it has a thin outer rim joined by a fusion-joint 83 to the surrounding thin edge of the tubular casing 61, as in the battery of FIG. 4. Within a passage of the thick metallic end-wall 82 is held affixed with a liquid-and-gas-tight metallic fusion-joint, the lower portion of a tubular insulating member 85 of suitable gas-and-liquid-tight inorganic material, for instance of strong, ceramic material similar to that of the ceramic junction collar 74 of FIG. 4. A liquid-and-gas-tight metallic terminal 87 of sheet metal has a rim 86 which is affixed by a liquid-and-gas-tight metallic fusion-joint to the outer surface of the upper portion of insulating tubular insulator 85. A lower surface portion of tubular insulator 85 which is spaced by an insulating surface of proper height from the upper fusion-joined surface thereof, is joined by similar liquid-and-gas-tight fusion joint to the thicker central collar portion 84 of the surrounding thick metallic casing wall 82.

The liquid-and-gas-tight, fused metallic junctions between the two insulatingly spaced outer tubular surfaces of tubular insulator 85 to the surrounding metal portions of casing end-wall collar 84 and upper metal terminal 87, may be formed, as described in connection with FIG. 6, for instance by metal brazing between the metallic portions of end-wall 82 and terminal member 87, and the previously metallized two separated junction surfaces of tubular insulator 85. To an inwardly-facing surface of the insulated metal terminal 87 is metallically affixed, as by welding, the outer end of upper positive electrode tab 44 of the electrode assembly. Two insulating sheets, 89, 89—1 serve to insulate the metallic terminal tab 44 from the overlying metal surfaces of end-wall 82 and underlying portions of the electrode assembly, as in the cell of FIG. 4. The bottomend-wall 62 of the tubular metallic casing 61 may be thick, as in FIG. 4, or it may be formed in one operation with the tubular casing 61 and be of the same thickness. The upper thick end-wall 82 carrying the insulated fusion-sealed metallic terminal 87, is made with such predetermined thickness as to cause it to deform under predetermined limited, raised internal gas pressure, such as 1000 p.s.i., by way of example, considerably smaller than the bursting pressure of 2000 p.s.i., for instance, of the tubular casing wall 61, for impairing or fracturing the metallic fusion-seal between end-wall collar 84 and tubular insulator 85 and releasing the enclosed gases through the impaired fusion-joint to the exterior space.

As seen in FIG. 5, the metallic bottom-casing end-wall may also be provided with an outwardly-extending metallic inspection tube 93 for testing the tightness of the casing walls and all its fusion joints, before completing the liquid-and-gas-tight enclosure, by pinching off the excess of the inspection tube and sealing its remaining short end portion by a liquid-and-gas-tight metallic fusion-joint. The metallic inspection tube 93 is shown formed of alkali-resistant sheet metal, and its inner end fits within an opening of bottom casing wall 63. To provide a liquid-and-gas-tight joint between them, the inner end of metallic inspection tube 93 has a lateral rim 94 which is brazed with a suitable brazing metal, such as a gold-nickel alloy, to the underlying surface of casing end-wall 62. With cell casing enclosures having such metallic inspection tube 93, all hermetic fusion seals of the casing enclosure around the electrode assembly 20, may be completed without supplying the limited volume of electrolyte to the electrode assembly 20. The hermetic tightness of such sealed and completed casing enclosure may be readily inspected by supplying gas under pressure through inspection tube 93 to the interior of the casing enclosure and determining in a conventional way whether, and the place or places where, gas escapes from the sealed casing enclosure.

After thus ascertaining the hermetic tightness of the casing enclosure, the predetermined amount of electrolyte is introduced through inspection tube 93 into the interior of the casing enclosure wherein the electrolyte is absorbed in the pores of the insulating separator and of the electrode plates. Thereupon the excess of metallic inspection tube 93 is cut off and the remaining short end of tube 93 is tightly folded, clamped and sealed off by metallic fusion or by applying to the clamped tube surfaces a metallic brazing alloy and heating to form a liquid-and-gas tight brazing closure junction on such tube end. Alternatively, the inspection tube 93 is cut off along the outer surface of metallic end-wall 62, and a gas-tight metallic sheet portion 94 of similar metal overlapping the so cut-off tube 93 and the surrounding surface of end-wall 62, is similarly brazed thereto to complete the liquid-and-gas-tight casing enclosure.

Without thereby limiting the scope of the invention, there are given below, data for a terminal end-wall such as terminal end-wall 82 of the metallically fused liquid-and-gas tight casing enclosure for a sealed, rechargeable cell as described above in connection with FIG. 5. In the case of a D-type cell, good results are secured when making the metallic terminal end-wall 82 out of a somewhat thicker metal blank by a coining operation which provides and end-wall about .078″ thick over its major area, with its central collar 84 being .125″ thick, and having the same radial width. In the case of a D-type cell, good results are obtained by making the tubular casing 61 about .028″ thick. In applications where the weight of such rechargeable cells has to be kept to a minimum, for instance for satellites, the thickness of the tubular casing wall may be reduced to .015″.

In all electrode assemblies of the type herein disclosed, good results are obtained with porous insulating spacers (that are interposed between the opposite-polarity electrode plates) consisting of conventional alpha cellulose filter paper. It is, however, of great advantage to use instead, a porous filter sheet, similar to alpha cellulose filter paper that is formed of matted, tangled fiber portions of polypropylene such as produced by the American Felt Company of Glenville, Connecticut, with the fibers of such filter sheet being thermally bonded at sufficient contact points to form a strong filter sheet. Such polypropylene filter sheets are very strong and withstand operation at relatively high temperatures. They may have a thickness as low as .003″, and may be of greater thickness such as .006″ or greater, such as .015″. Instead of strong and temperature-stable filter sheets made with polypropylene fibers, similar filter sheets made of other strong and similarly temperature-stable synthetic resin fibers may be used, such as fibers of nylon, polyester, acrylic resins, and the like. In the case of fibers which do not readily wet, a small addition of a wetting agent may be admixed to the resins out of which the fibers for the filter sheet is formed.

It will be apparent to those skilled in the art that the novel principles of the invention disclosed herein in connection with the specific exemplifications thereof, will suggest various other modifications and applications of the same. It is accordingly desired that in construing the breadth of the appended claims, they shall not be limited to the specific exemplifications of the invention described herein.

I claim:

1. In a sealed, rechargeable storage battery cell, an electrode assembly having one cell electrode and at least one other opposite-polarity cell electrode with electrolyte held between said electrodes and tending to develop gases upon recharging said cell, an integral metallic casing enclosing said electrode assembly and having a relatively thin tubular casing wall and two opposite end walls, at least one metallic terminal having an inner terminal region connected to one of said cell electrodes and carried by one of said two end walls a solid, tubular, relatively thick inorganic insulating member within a passage in said one end wall and having a tubular surface affixed by gas-tight fusion-seal to the surrounding metal wall passage, said metallic terminal being affixed by a gas-tight fusion-seal to a further continuous tubular surface of said insulating member separated by an insulating surface from said one tubular surface at least a substantial part of said one end wall being of a wall thickness at least twice greater than that of said tubular wall and of sufficiently great thickness to suppress deformation of said one end wall and impairment of said fusion-seals under internal pressure developed under normal charging conditions that would otherwise cause such a deformation of said one end wall.

2. In a sealed rechargeable cell as claimed in claim 1, said one thick end wall having a wall rim thinner than said thicker end-wall part and surrounded by the adjacent edge end region of said tubular casing member with the edge of said wall rim being joined to the surrounding edge of the tubular casing wall by a gas-tight metallic fusion joint at elevated temperature.

3. In a sealed, rechargeable storage battery cell, an electrode assembly having one cell electrode and at least one other opposite-polarity cell electrode with electrolyte held between said electrodes and tending to develop gases upon recharging said cell, an integral metallic casing enclosing said electrode assembly and having a relatively thin tubular casing well and two opposite end walls, each of said two casing end walls being throughout of a wall thickness at least twice greater than the wall thickness of said tubular casing wall, at least one elongated metallic terminal having an inner terminal region connected to one of said cell electrodes and passing with its side walls through a wall passage of one end wall to the exterior space, a solid, radially thick inorganic insulating member within said wall passage and having a tubular surface affixed by gas-tight fusion-seal to the surrounding metal wall passage, said metallic terminal being affixed by a gas-tight fusion seal to a further continuous tubular surface of said insulating member separated by an insulating surface from said one tubular surface, the other of said electrodes being connected to an exposed metallic portion of said cell, at least a substantial part of said one end wall being of sufficiently great thickness to suppress deformation of said one end wall and impairment of said fusion seals under internal pressure developed under normal charging conditions that would otherwise cause such deformation of said one end wall, each of said end walls having a relatively thinner wall rim surrounded by the adjacent edge end region of said tubular casing with the edge of each wall rim being joined to the surrounding edge of the tubular casing wall by a gas-tight metallic fusion joint at elevated temperature.

4. In a sealed, rechargeable storage battery cell, an electrode assembly having one cell electrode and at least one other opposite-polarity cell electrode with electrolyte held between said electrodes and tending to develop gases upon recharging said cell, an integral metallic casing enclosing said electrode assembly and having a relatively thin tubular casing wall and two opposite end walls, at least one elongated, hollow, generally tubular metallic terminal having its inner terminal region connected to one of said cell electrodes and passing with its tubular terminal side wall through a wall passage of one of said two end walls, a solid, radially thick inorganic insulating member surrounding a sealed length of said terminal side wall and held affixed by gas-tight fusion seals to the surrounded terminal side wall and to the surrounding wall passage of said one end wall, at least a substantial part of said one end wall being of a wall thickness at least twice greater than that of said tubular wall and having sufficient thickness to suppress deformation of said one end wall and impairment of said gas-tight fusion-seals under normal charging conditions that would otherwise cause such deformation of said end wall, the other of said electrodes being connected to an exposed metallic portion of said cell, the interior space of said tubular terminal being connected to the exterior space, a deformable metallic sheet underlying the open inner tube end of said tubular terminal, and gas-tight metallic fusion junctions joining the peripheral sheet region of said metallic sheet to said inner tube end, said fusion junctions joining said metallic sheet to the adjoining portions of said tubular casing wall and constituting therewith a gas-tight enclosure around said electrode assembly suppressing escape of gases and electrolyte from the casing enclosure through said interior terminal space.

5. In a sealed, rechargeable storage battery cell, an electrode assembly having one cell electrode and at least one other opposite-polarity cell electrode with electrolyte held between said electrodes and tending to develop gases upon recharging said cell, an integral metallic casing enclosing said electrode assembly and having a relatively thin tubular casing wall and two opposite end walls, at least one elongated, hollow, generally tubular metallic terminal having its inner terminal region connected to one of said cell electrodes and passing with its tubular terminal side wall through a wall passage of one of said two end walls, a solid, radially thick inorganic insulating member surrounding a sealed length of said terminal side wall and held affixed by gas-tight fusion seals to the surrounded terminal side wall and to the surrounding wall passage of said one end wall, at least a substantial part of said one end wall being of a wall thickness at least twice greater than that of said tubular wall and having sufficient thickness to suppress deformation of said one end wall and impairment of said gas-tight fusion-seals under normal charging conditions that would otherwise cause such deformation of said end wall, the other of said electrodes being connected to an exposed metallic portion of said cell, an exterior portion of said tubular terminal having an opening connecting its interior terminal space to the exterior space, a deformable metallic sheet underlying the open inner tube end of said tubular terminal, and gas-tight metallic fusion junctions joining the peripheral sheet region of said metallic sheet to said inner tube end, said fusion junctions joining said metallic sheet to the adjoining portions of said tubular casing wall and constituting therewith a gas-tight enclosure around said electrode assembly suppressing escape of gases and electrolyte from the casing enclosure through said interior terminal space, said metallic sheet having an intermediate sheet section with a thickness at most of the order of 0.008" and sufficiently thin to cause said sheet section to be deformed in outward direction under predetermined high gas pressure developed in said enclosure, said hollow tubular terminal carrying a piercing projection extending inwardly toward said metallic sheet section for piercing said sheet section when deformed outwardly by gas pressure within said casing enclosure and causing interior gases to be discharged through said interior terminal space.

6. In a sealed, rechargeable storage battery cell, an electrode assembly having one cell electrode and at least one other opposite-polarity cell electrode with electrolyte held between said electrodes and tending to develop gases upon recharging said cell, an integral metallic casing enclosing said electrode assembly and having a relatively thin tubular casing wall and two opposite end walls, at least one elongated, hollow, generally tubular metallic terminal having its inner terminal region connected to one of said cell electrodes and passing with its tubular terminal side wall through a wall passage of one of said two end walls, a solid, radially thick inorganic insulating member surrounding a sealed length of said terminal side wall and held affixed by gas-tight fusion seals to the surrounded terminal side wall and to the surrounding wall passage of said one end wall, at least a substantial part of said one end wall being of a wall thickness at least twice greater than that of said tubular wall and having sufficient thickness to suppress deformation of said one end wall and impairment of said gas-tight fushion-seals under normal charging conditions that would otherwise cause such deformation of said end wall, the other of said electrodes being connected to an exposed metallic portion of said cell, the open inner tube end of said tubular terminal having a laterally-outward extending tube rim, said tubular terminal having an exterior opening connecting its interior space to the exterior space, a deformable metallic sheet underling the inner tube end of said terminal and its tube rim, and gas-tight metallic fusion junctions joining the peripheral sheet region of said metallic sheet to said inner tube rim said fusion junction joining said metallic sheet to the adjoining portions of said tubular casing wall and constituting therewith a gas-tight enclosure around said electrode assembly suppressing escape of gas and electroylte from the casing enclosure through said interior terminal space, said metallic sheet having an intermediate sheet section with a thickness at most of the order of 0.008" and sufficiently thin to cause said sheet section to be broken open under predetermined high gas pressure developed in said enclosure for discharging interior gases through said broken sheet section and said tubular terminal to said exterior space.

7. In a sealed, rechargeable storage battery cell, an electrode assembly having one cell electrode and at least one other opposite-polarity cell electrode with electrolyte held between said electrodes and tending to develop gases upon recharging said cell, an integral metallic casing enclosing said electrode assembly and having a relatively thin tubular casing wall and two opposite end walls, at least one elongated, hollow, generally tubular metallic terminal having its inner terminal region connected to one of said cell electrodes and passing with its tubular terminal side wall through a wall passage of one of said two end walls, a solid, radially thick inorganic insulating member surrounding a sealed length of said terminal side wall and held affixed by gas-tight fusion seals to the surrounded terminal side wall and to the surrounding wall passage of said one end wall, at least a substantial part of said one end wall being of a wall thickness at least twice greater than that of said tubular wall and having sufficient thickness to suppress deformation of said one end wall and impairment of said gas-tight fusion-seals under normal charging conditions that would otherwise cause such deformation of said end wall, the other of said electrodes being connected to an exposed metallic portion of said cell, the open inner tube end of said tubular terminal having a laterally-outward extending tube rim, the exterior portion of said tubular terminal having an opening connecting its interior terminal space to the exterior space, a deformable metallic sheet underlying the open inner tube end of said tubular terminal and its tube rim, and gas-tight metallic fusion joint joining the peripheral sheet region of said metallic sheet to said inner tube rim, said fusion junctions joining said metallic sheet to the adjoining portions of said tubular casing wall and constituting therewith a gas-tight enclosure around said electrode assembly suppressing escape of gases and electrolyte from the casing enclosure through said interior terminal space, said metallic sheet having an intermediate sheet section with a thickness at most of the order of 0.008" and sufficiently thin to cause said sheet section to be deformed in outward direction under predetermined high gas pressure developed in said enclosure, said hollow tubular terminal carrying a piercing projection extending inwardly toward said metallic sheet section for piercing said sheet section when deformed outwardly by gas pressure within said casing enclosure and causing interior gases to be discharged through said interior terminal space.

8. In a sealed rechargeable cell as claimed in claim 4, said one thick end wall having a relatively thin wall rim surrounded by the adjacent edge end region of said tubular casing member with the edge of said wall rim being joined to the surrounding edge of the tubular casing wall by a gas-tight metallic fusion joint at elevated temperature.

9. In a sealed rechargeable cell as claimed in claim 6, said one thick end wall having a relatively thin wall rim surrounded by the adjacent edge end region of said tubular casing member with the edge of said wall rim being joined to the surrounding edge of the tubular casing will by a gas-tight metallic fusion joint at elevated temperature.

10. I a sealed rechargeable cell as claimed in claim 7, said one thick end wall having a relatively thin wall rim surrounded by the adjacent edge and region of said tubular casing member with the edge of said wall rim being joined to the surrounding edge of the tubular casing wall by a gas-tight metallic fusion joint at elevated temperature.

11. In a sealed rechargeable cell as claimed in claim 4, each of said end walls being at least twice thicker than said tubular casing wall, and constituting with the adjoining casing structure a gas-tight casing enclosure around said electrode assembly.

12. In a sealed rechargeable cell as claimed in claim 6, each of said end walls being at least twice thicker than said tubular casing wall, and constituting with the adjoining casing structure a gas-tight casing enclosure around said electrode assembly.

13. In a sealed rechargeable cell as claimed in claim 7, each of said end walls being at least twice thicker than said tubular casing wall, and constituting with the adjoining casing structure a gas-tight casing enclosure around said electrode assembly.

14. In a sealed rechargeable cell as claimed in claim 1, said metallic terminal extending through the interior of said tubular insulating member and being affixed by a gas-tight fusion-seal to surrounding surface portions thereof.

15. In a sealed, rechargeable storage battery cell, an electrode assembly having one cell electrode and at least one other opposite-polarity cell electrode with electrolyte held between said electrodes and tending to develop gases upon recharging said cell, an integral metallic casing enclosing said electrode assembly and having a relatively thin tubular casing wall and two opposite end walls, at least one of said casing end walls being throughout of a wall thickness at least twice greater than the wall thickness of said tubular casing wall and of sufficiently great thickness to suppress deformation of said one end wall under internal pressure at least one-fourth of the pressure causing bursting of said tubular casing wall, at least one metallic terminal having an inner terminal region connected to one of said cell electrodes and carried by said one end wall, a solid, tubular, relatively thick ceramic insulating member within a passage in said one end wall and having a tubular surface affixed by gas-tight metallic fusion-seal at elevated temperature to the surrounding metal wall passage, said metallic terminal being affixed by a gas-tight metallic fusion-seal at elevated temperature to a further continuous tubular surface of said insulating member separated by an insulating surface from said one tubular surface.

16. In a sealed rechargeable cell as claimed in claim 15, said metallic terminal having a tubular terminal portion with a tubular surface affixed by said metallic fusion-seal to said further insulating-member tubular surface.

17. In a sealed rechargeable cell as claimed in claim 16, an interior tubular surface of said tubular terminal portion being affixed by said metallic fusion-seal to said further tubular surface extending along the exterior of said tubular insulating member.

18. In a sealed rechargeable cell as claimed in claim 15, said one thick end wall having a relatively thinner wall rim surrounded by the adjacent edge end region of said tubular casing member with the edge of said wall rim being joined to the surrounding edge of the tubular casing wall by a gas-tight metallic fusion joint at elevated temperature.

References Cited in the file of this patent

UNITED STATES PATENTS

| | | |
|---|---|---|
| 1,898,344 | Deibel | Feb. 21, 1933 |
| 2,169,702 | Marsal | Aug. 15, 1939 |
| 2,479,872 | Seiden | Aug. 23, 1949 |
| 2,487,499 | Webb | Nov. 8, 1949 |
| 2,490,598 | Oliver | Dec. 6, 1949 |
| 2,693,906 | Morgan | Oct. 26, 1954 |
| 2,708,213 | Kren | May 10, 1955 |
| 2,915,577 | Bronstert | Dec. 1, 1959 |